Figure 1:
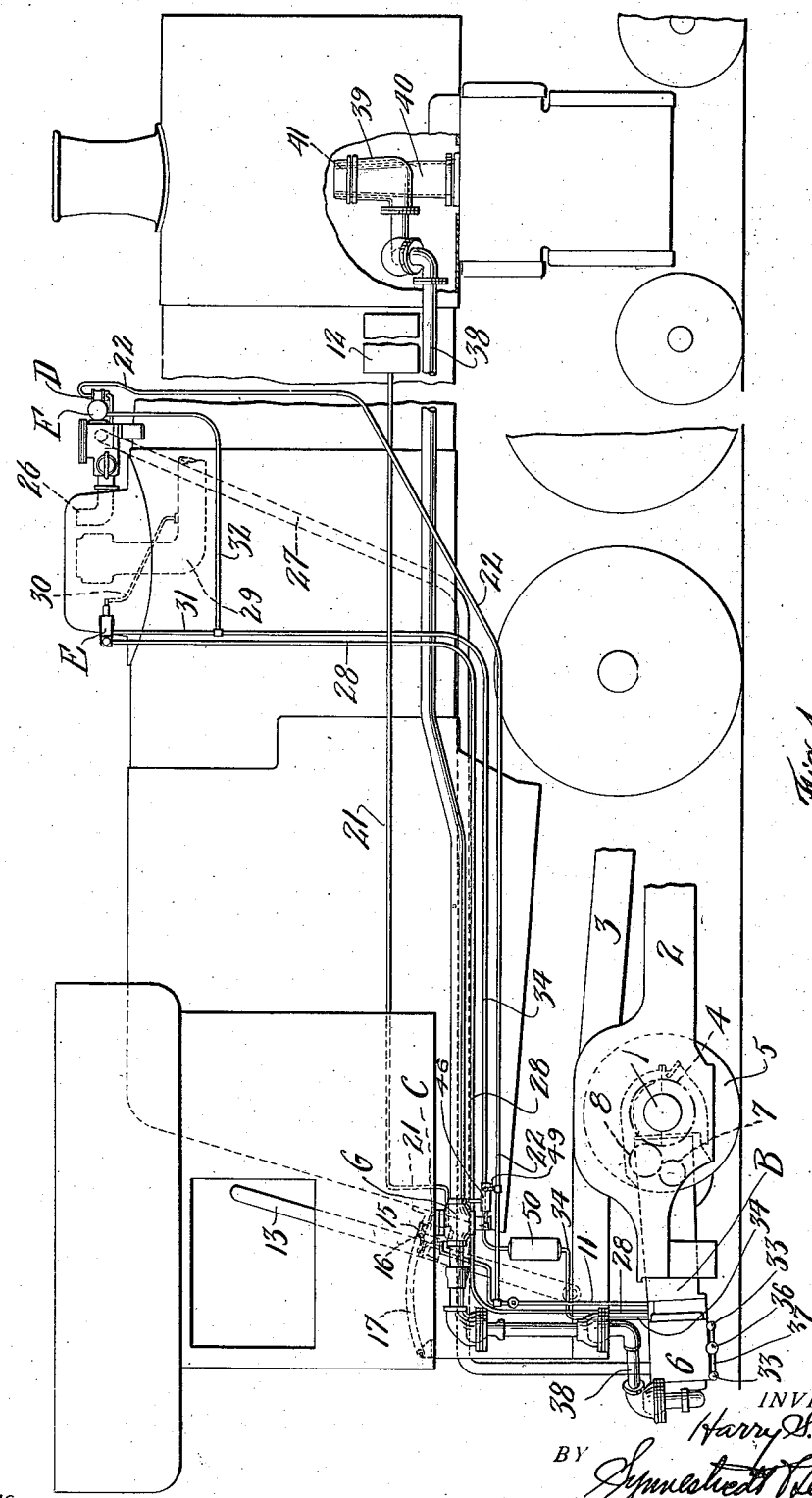

Dec. 14, 1926.

H. S. VINCENT 1,610,338

LOCOMOTIVE BOOSTER MOTOR APPARATUS

Filed April 23, 1923      3 Sheets-Sheet 1

WITNESS
Gustav Genzlinger.

INVENTOR
Harry S. Vincent
BY
ATTORNEYS

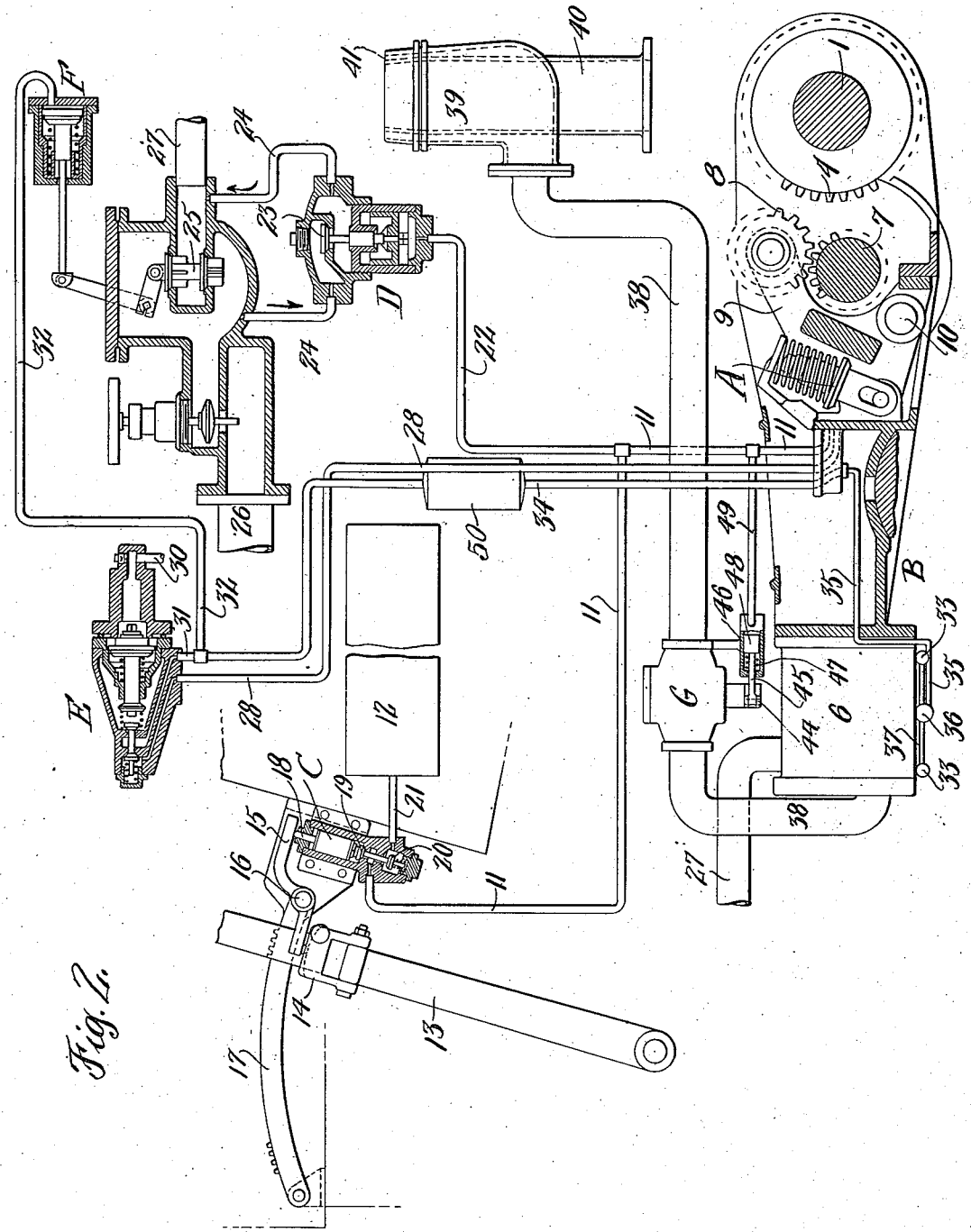

Dec. 14, 1926.  H. S. VINCENT  1,610,338
LOCOMOTIVE BOOSTER MOTOR APPARATUS
Filed April 23, 1923    3 Sheets-Sheet 3
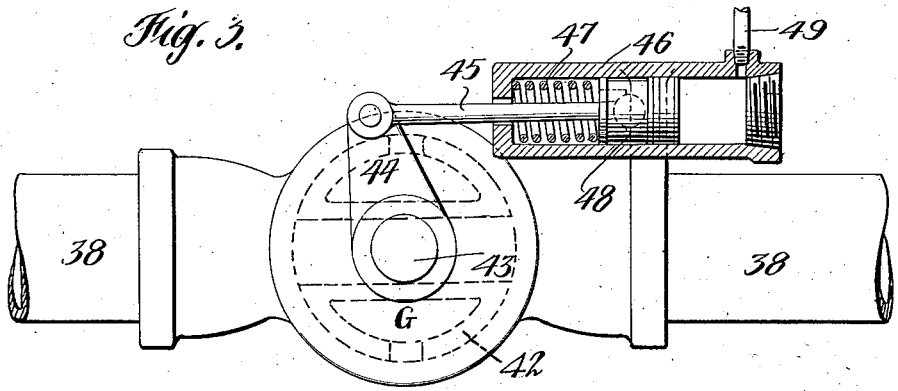
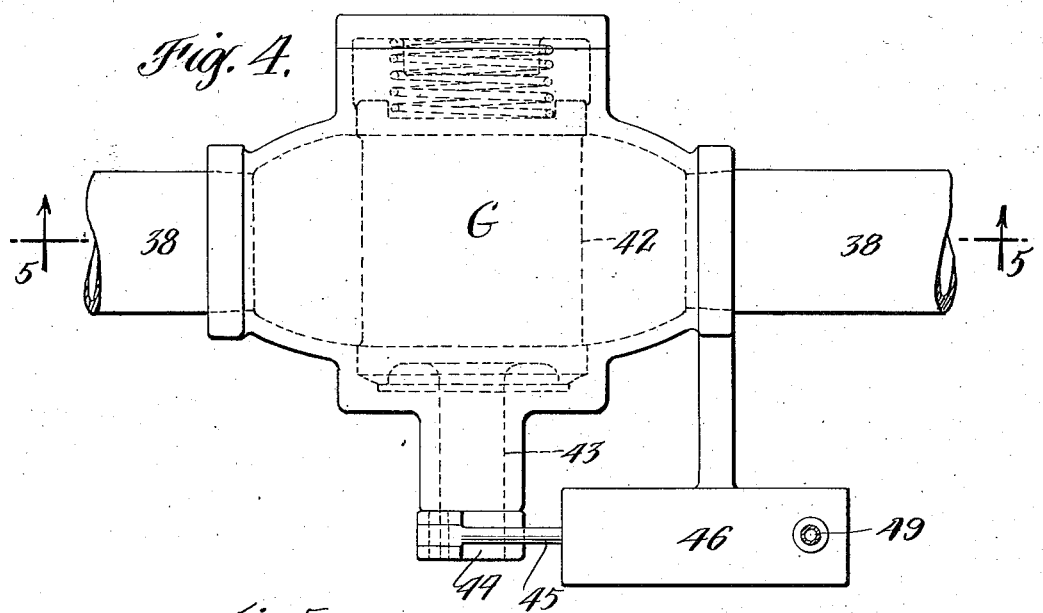
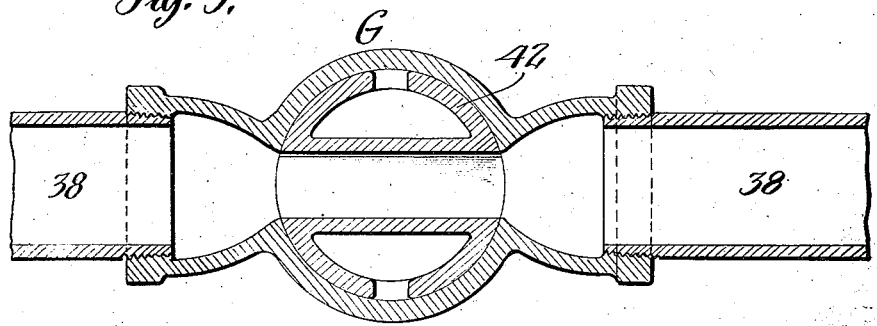

Patented Dec. 14, 1926.

1,610,338

UNITED STATES PATENT OFFICE.

HARRY S. VINCENT, OF RIDGEWOOD, NEW JERSEY, ASSIGNOR TO FRANKLIN RAILWAY SUPPLY COMPANY, A CORPORATION OF DELAWARE.

LOCOMOTIVE BOOSTER-MOTOR APPARATUS.

Application filed April 23, 1923. Serial No. 633,830.

This invention relates to booster motor equipment for locomotives of the type which has been illustrated, for instance, in Patent No. 1,339,395 issued to H. L. Ingersoll on May 11th, 1920. Although this patent as well as the present application illustrates the booster motor as applied to the axle and wheels of a locomotive trailer truck I wish it to be understood that my present invention is not intended to be limited to such an arrangement inasmuch as it could be applied equally well to an arrangement wherein the booster motor was adapted to drive the axle and wheels at any other location either on the locomotive or on the tender. The present invention relates primarily to the manner of and the means for handling and disposing of the exhaust steam from the booster motor.

Before continuing with this specification it should be noted that booster motors of the character herein disclosed are intended to aid the locomotive in starting and at slow speeds but are not intended to operate at higher speeds. They are always arranged therefore to be entrained and disentrained from the axle which they drive as occasion demands. It will therefore be seen that there will be many more or less long periods of time during which the booster motor will be inoperative. While the booster motor is operating it has been proposed to mingle its exhaust steam with the exhaust steam from the locomotive and to this end a special pipe has been provided to carry the booster exhaust to the locomotive nozzle. This steadies the draft during such times as the locomotive is working hard and accomplishes other useful functions which it is not necessary to mention at the present time since they form no part of the invention herein.

With the foregoing in mind the chief object of my invention will be better understood, the same being the provision of means for automatically keeping the booster exhaust line closed during such times as the booster is inoperative and automatically opening said line whenever the booster is called into operation and this for the reason that during such times as the booster is inoperative the locomotive exhaust would be undesirably blanketed by the suction through the booster exhaust pipe were such pipe to be kept open at such times.

A further object of the invention is to provide means of the character just above specified which is under the control or influence of the controlling devices or controlling system provided for the booster motor. These together with such other objects as are incident to my invention or may appear hereinafter I attain by means of a construction which I have illustrated in preferred form in the accompanying drawings wherein:

Fig. 1 is a partial side elevation of a locomotive illustrating my improvement applied thereto; Fig. 2 is a diagrammatic layout of the booster controlling mechanism with my improvement associated therewith; and Figs. 3, 4 and 5 are enlarged side plans and sectional views of one of the principal parts of my invention.

Referring to the drawings it will be seen that I have applied the locomotive booster motor B to the axle 1 of the trailer truck 2 the forward end of which is shown as broken away although it will be understood of course that it is pivoted in the usual way to some portion of the main locomotive frame 3. The axle 1 carries a gear 4 located at some convenient point between the wheels 5. The cylinders 6 of the booster motor actuate the driving pinion 7 which can be entrained or disentrained from the gear 4 by means of the movable idler gear 8. An examination of Fig. 2 will show that the idler gear 8 is mounted upon a rocking member 9 pivoted at the point 10, the rocker 9 being moved by an entraining motor device indicated as a whole by the reference character A, the details of which are not illustrated inasmuch as they form no part of the present invention. The entraining motor A is fluid operated preferably by air the supply of which is introduced through the pipe 11.

The flow to the pipe 11 comes from the air reservoir 12 and is controlled by means of the reverse lever 13 with its so called booster latch 14, the member 15 pivoted at 16 and the reverse lever pilot valve indicated as a whole by the reference character C. When the reverse lever 13 is moved into the forward corner of the quadrant 17 as illustrated in Fig. 2 and the latch 14 is swung upwardly to the position in which it is shown the right hand end of member 15 will be forced downwardly to act upon the plunger 18 in the reverse lever pilot valve C. This will close exhaust valve 19 and open valve 20 so that pressure from the reservoir 12 may flow out through the pipe 21, through the reverse lever pilot valve C and into pipe 11. In this way the booster controlling system is placed in the proper condition to perform its various functions. A much more detailed description of the general arrangement herein disclosed will be found in the patent above mentioned the matter herein given being simply sufficient for the purpose of properly disclosing my present invention which in and of itself has nothing to do with the booster controlling system so far in use. This art has become well established at the present time and it is therefore thought unnecessary to burden the present application with more detail than is necessary for the present disclosure.

At the same time that the air pressure has actuated the entraining motor A it has entered the preliminary booster throttle D through the pipe 22 where it acts to open the valve 23 thereby permitting steam to flow in relatively small quantities through the by-pass 24 around the main booster throttle 25 the line of flow being in the direction of the arrows. The pipe 26 comes from the dome and the pipe 27 leads to the booster cylinders. The part of the apparatus just described ensures easy meshing of the gears 8 and 4 since the relatively small quantity of steam preliminarily supplied through the by-pass 24 reciprocates the booster cylinders slowly during the time that entrainment is taking place.

As soon as entrainment has taken place communication between the pipes 11 and 28 is established so that air pressure can reach the dome pilot valve E. Here further progress of air pressure is blocked until the locomotive throttle has been opened. Just as soon however as the locomotive throttle has been opened pressure from the dry pipe 29 is conducted to the dome pilot valve E through the tubing 30 and this pressure establishes communication between the pipes 28 and 31 in a manner the details of which need not be fully described. Pressure from the pipe 31 is conducted to the booster throttle operating cylinder F through the conduit 32. In a manner now well understood in this art the throttle cylinder or throttle operating cylinder F opens the booster throttle 25 to admit full operating pressure to the booster cylinders.

Practically as soon as the booster is put into operation in the manner thus described it is necessary to close the booster cylinder cocks 33. This is accomplished by utilizing the pressure from pipe 31 through pipes 34 and 35, the latter leading to an operating cylinder 36 which, through suitable coupling rods 37 is adapted to close the cylinder cock 33 which are otherwise normally spring held in open position. None of this controlling system is gone into in very great detail here for the reason that it is now all well known in the art and forms no part of the present invention.

After the booster has been placed in operation the exhaust steam is conducted through the conduit 38 to a housing 39 around the exhaust nozzle 40. There is an annular space between the nozzle 40 and the housing 39 which discharges through a substantially circular outlet 41 around the locomotive nozzle. By reason of this discharge of the booster exhaust it will readily be seen that when the booster is inoperative the locomotive exhaust would by suction create a vacuum in the exhaust line 38 which would tend to pull in air through the cylinder cocks 33. This air would jacket or blanket the draft from the nozzle 40 with ill effects upon the operation of the locomotive.

In order to overcome this I introduce the valve structure G into the exhaust line 38. The details of this valve structure are best shown in Figs. 3 to 5 inclusive although reference must be made to Fig. 2 for a showing of the proper connections.

To the plug valve 42 or rather to the stem 43 of the plug valve 42 is attached an operating crank 44 from which a piston rod 45 enters the cylinder 46. The spring 47 acting against the piston 48 normally holds this valve in its closed position shutting off communication from the booster exhaust to the locomotive nozzle. As soon as the booster is operating however and air pressure is present in the pipe 11 or in some other portion of the booster controlling system as may be desired air will flow through the pipe 49 to the base of the piston 48 opposite to that upon which the spring 47 bears. The spring will therefore be compressed and the crank 44 will rotate the plug valve to the open position illustrated in Figs. 3 and 5.

In this way therefore it will be seen that I provide for an automatic opening of the booster exhaust line whenever the booster is placed in operation and an automatic closure thereof whenever the booster motor is not in operation. Furthermore I have placed this automatic arrangement under the influence of the controlling system for the locomotive booster motor.

It might be mentioned that I have shown the usual timing reservoir 50 in the cylinder cock closing line 34 which is simply for the purpose of holding back a little on the moment when the cylinder cocks will be closed.

I claim:

1. In a locomotive, the combination with its exhaust line, of a steam operated booster motor, a line for discharging the booster exhaust with the locomotive exhaust, means normally closing the booster exhaust line when the booster is inoperative, and means for automatically opening said line when the booster is operating.

2. In a locomotive, the combination with its exhaust line, of a steam operated booster motor, a control system for the booster, a line for discharging the booster exhaust with the locomotive exhaust, and means under the influence of the control system for opening the booster exhaust line when the booster is to be operated and closing it when the booster ceases to operate.

3. In a locomotive, the combination with its exhaust line, of a steam operated booster motor, a control system for the booster, a line for discharging the booster exhaust with the locomotive exhaust, means normally closing the booster exhaust line when the booster is inoperative, and means under the influence of the control system for opening said line when the booster is operating.

4. In a locomotive, the combination with its exhaust nozzle and stack, of a steam operated booster motor, a line for discharging the booster exhaust into the stack around the locomotive nozzle, means normally closing said line when the booster is inoperative, and means for automatically opening said line when the booster is operating.

5. In a locomotive, the combination with its exhaust stack, of a steam operated booster motor, a line for discharging the booster exhaust into the stack around the column of the locomotive exhaust, means adapted to close said line when the booster is inoperative, and means for automatically opening said line when the booster is operating.

6. In a locomotive, the combination with its exhaust line, of a steam operated booster motor, a fluid actuated control system for the booster, a line for discharging the booster exhaust with the locomotive exhaust, a normally closed valve for controlling the booster exhaust line, and means for holding said valve in open position, said means being actuated by the pressure in the fluid control system when the booster is operating.

7. In a locomotive, the combination with its exhaust line, of a steam operated booster motor, an air actuated control system for the booster, a line for discharging the booster exhaust with the locomotive exhaust, means normally closing the booster exhaust line when the booster is inoperative, and means under the influence of the air control system for opening said line when the booster is operating.

8. In a locomotive, the combination with its exhaust line, of a steam operated booster motor, an air actuated control system for the booster, a reverse lever pilot valve for said system, a line for discharging the booster exhaust with the locomotive exhaust, means for normally closing the booster exhaust line when the booster is inoperative, and means for opening said line; said last means being actuated by the pressure in the controlling system after the reverse lever pilot valve has been opened.

In testimony whereof, I have hereunto signed my name.

HARRY S. VINCENT.